UNITED STATES PATENT OFFICE.

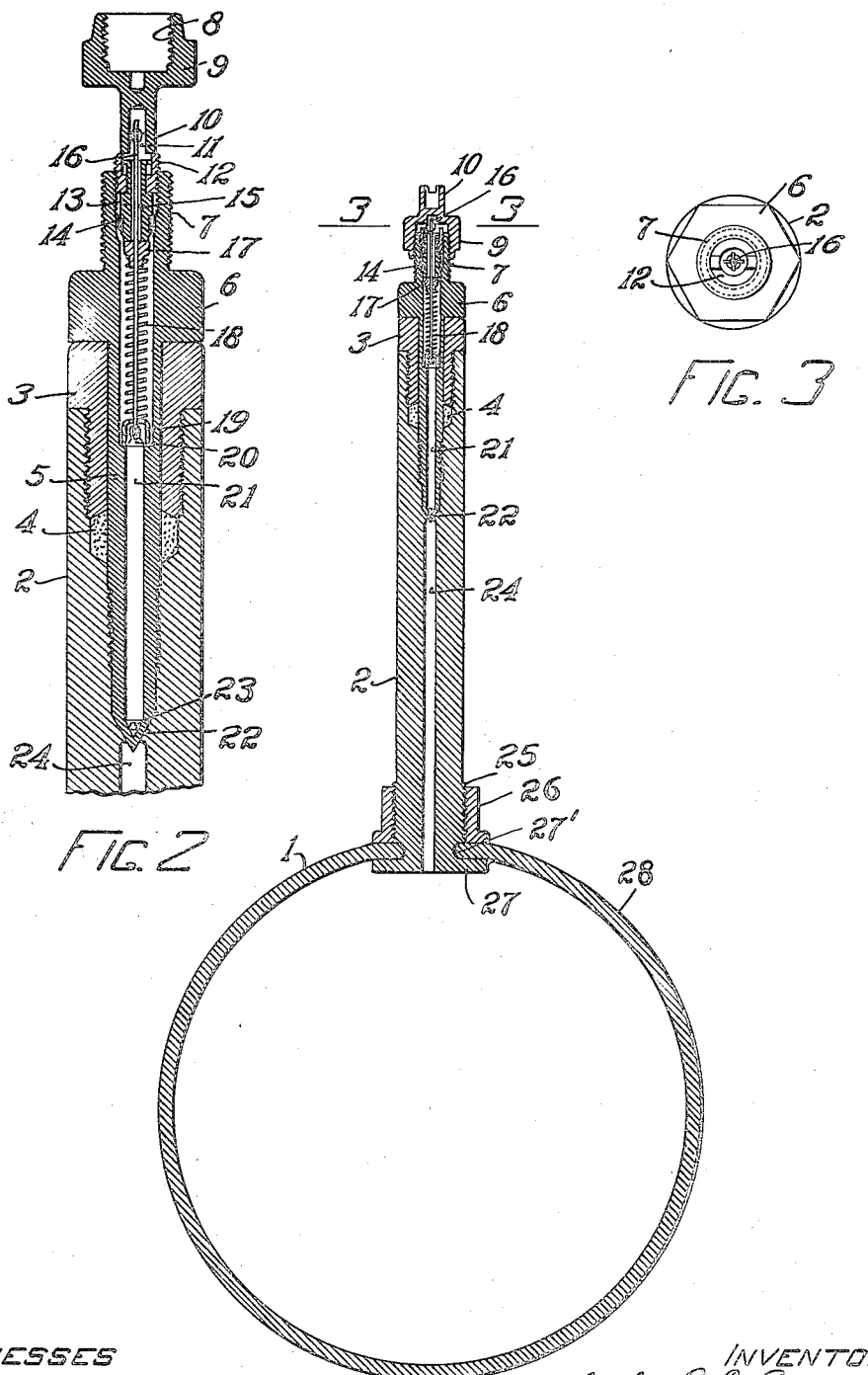

CHARLES R. C. BORDEN, OF BROOKLINE, MASSACHUSETTS.

VALVE FOR AUTOMOBILE-TIRES.

1,045,937.  Specification of Letters Patent.  Patented Dec. 3, 1912.

Application filed December 14, 1911. Serial No. 665,612.

*To all whom it may concern:*

Be it known that I, CHARLES R. C. BORDEN, a citizen of the United States, residing at Brookline, county of Norfolk, Commonwealth of Massachusetts, have invented certain new and useful Improvements in Valves for Automobile-Tires, of which the following is a specification.

This invention relates to valves and particularly to a valve for controlling the inflation of a pneumatic automobile tire. In valves of this nature much difficulty has been experienced in devising controlling means sufficiently sensitive to yield readily to the action of the pump and yet sufficiently strong to withstand the varying pressure of the tire under the extreme conditions of temperature and road. A great deal of difficulty has arisen from a so called "slow leak," by which the tire becomes gradually deflated so that without becoming sufficiently soft to attract the notice of the driver, the pressure is sufficiently relaxed so that the tire becomes subject to needless wear which might have been avoided had the proper working pressure been maintained.

It is the object of my invention to provide a valve structure permitting inflation even by a light hand pump and yet being capable of a setting after inflation which will absolutely insure the retention of the tire pressure. To this end, I have devised a combination valve affording possibilities of construction by which these results may be accomplished within the usual stem, which has been adopted as a common type and convenient standard.

In the specification which follows, I shall disclose the form of my invention which I find well adapted to practical use as conformable to accepted types of equipment. This form I have illustrated in the drawings which form a part of the specification. Throughout specification and drawings like reference numerals are employed to indicate corresponding parts and in the drawings:

Figure 1 is a central vertical section through the valve stem showing also the inner tube of the tire. Fig. 2 is an enlarged detail of a portion of the valve stem showing the valve construction, and Fig. 3 is a plan view of the stem showing the stem end with the cap removed.

I have indicated at 1 the usual inner tire tube attached to a stem 2, of the usual external appearance. On the upper end of the stem 2 is a threaded sleeve 3 for compressing a packing 4 which surrounds a needle valve 5. The valve 5 has near its top a portion 6 which is faced off for the engagement of a wrench, and terminating at its upper end in an externally threaded portion 7, adapted to receive an internally threaded portion 8 of the usual valve cap 9. This valve cap 9 is provided with an extension 10 having a slotted, spanner end 10' recessed at 11.

Within the upper end of the needle valve 5 which is counterbored to receive it, I place a check valve comprising an externally threaded plug 12 in which a valve member 13 provided with a rubber packing 14 is loosely mounted. The valve member 13 is longitudinally bored to receive a guiding stem 16 about which the spring 18 is coiled. A block 17 bears against the end of the spring 18 and against the lower side of the valve 13. The lower end of the spring 18 is supported by an inverted cup 19 through which the stem 16 passes. The cup is notched at 20 for the passage of the air. The valve 13 seats upon a conical shoulder formed in the counterbore of the end 7 of the needle valve. The central passage 21 of the needle valve is connected with an opening 23 which passes through the conical lower end of the needle valve 5. This conical end of the needle valve seats against a beveled shoulder 22 which is arranged just above the longitudinal passage 24 of the stem 2.

In use the valve is employed as follows: When it is desired to inflate the tire 1 the cap 10 is first unscrewed, the needle valve 5 is opened by turning the faced off portion 6, the pump connection is made with the end 7 and the valve inflated at the pressure desired. During this pumping action the check valve 14 holds the back pressure on each stroke of the piston but as soon as the desired pressure is reached, the needle valve 5 is screwed down so that its tapered end finds the seat 22, thus permanently closing the opening 23. Pump connections are then removed and the cap 10 is returned to its position as shown in Fig. 1. When the tire is inflated, therefore, the pressure from the tire is carried by the pointed end of the needle valve 5 thus removing a strain from the light check valve 13 which is located above it.

When it is desired to replace the check valve 13 the change may be made without losing the pressure of the tire. The entire needle valve, carrying the check valve with it, may be removed at any time for the adjustment of parts or the replacing of the check valve.

When it is desired to deflate the tire the needle valve 5 is unscrewed wholly, giving a rapid discharge of the compressed air within the tire. The tire may however be discharged without removing the needle valve 5 by merely opening it slightly and by pressing the end 16 of the check valve 13.

Various modifications may obviously be made in the form of the check valve and in the use and construction of the needle valve, all without departing from the spirit of my invention if within the limits of the appended claims.

What I, therefore, claim and desire to secure by Letters Patent is:—

1. An inflation valve comprising a stem having a longitudinal bore, a seat within said bore, a hollow spindle open at its outer end in said bore, a valve on said spindle and adapted to coact with said seat, a check valve removably lodged within the open end of said hollow spindle, the open outer end of said hollow spindle being of size to permit access to said hollow spindle for the insertion or removal of said check valve.

2. An inflation valve comprising a stem having a longitudinal bore, an outwardly disposed seat within said bore, a hollow spindle open at its outer end in said bore, a valve on the end of said spindle, means for moving said spindle to seat said valve, a check valve removably lodged within the open end of said hollow spindle, the open outer end of said hollow spindle being of size to permit access to said hollow spindle for the insertion or removal of said check valve.

3. An inflation valve comprising a stem having a longitudinal bore, a seat within said bore, said bore being enlarged above said seat for a packing, a shouldered gland threaded into said enlargement to compress said packing and having said shoulder overlying said stem end but not extending outside thereof, a hollow spindle open at its outer end in said bore, and extending through said gland, and having a shoulder overlying said gland shoulder but not extending outside thereof, and a check valve removably lodged within the open end of said spindle, the said open outer end of said hollow spindle being of size to permit access to said hollow spindle for the insertion or removal of said check valve.

In testimony whereof I affix my signature in presence of two witnesses.

CHARLES R. C. BORDEN.

Witnesses:
R. B. ELLMS,
V. LOWDEN.